United States Patent
Goyal et al.

(10) Patent No.: US 9,601,121 B1
(45) Date of Patent: Mar. 21, 2017

(54) OVERRIDE VOCODER CAPACITY OPERATING POINT ALLOCATION

(75) Inventors: Anoop Kumar Goyal, Overland Park, KS (US); Jasinder Pal Singh, Olathe, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 1091 days.

(21) Appl. No.: 13/425,069

(22) Filed: Mar. 20, 2012

(51) Int. Cl.
*G10L 19/00* (2013.01)
*H04M 7/00* (2006.01)
*H04W 28/02* (2009.01)

(52) U.S. Cl.
CPC ........... *G10L 19/00* (2013.01); *H04M 7/0072* (2013.01); *H04W 28/0231* (2013.01)

(58) Field of Classification Search
CPC .. H04L 5/1438; H04L 69/24; H04M 2207/18; H04M 7/0057; H04M 7/006; H04M 7/0072; H04M 3/42; H04W 28/0231; H04W 28/08; H04W 72/04; G10L 19/00
See application file for complete search history.

(56) References Cited

U.S. PATENT DOCUMENTS

| | | | |
|---|---|---|---|
| 7,328,027 B1 * | 2/2008 | Mangal | 455/453 |
| 8,254,930 B1 * | 8/2012 | Mauer et al. | 455/436 |
| 8,908,605 B1 * | 12/2014 | Oroskar | 370/328 |
| 2002/0193133 A1 * | 12/2002 | Shibutani | 455/522 |
| 2004/0203938 A1 | 10/2004 | Kulkarni | |
| 2006/0246938 A1 * | 11/2006 | Hulkkonen et al. | 455/522 |
| 2007/0190950 A1 | 8/2007 | Madhavan et al. | |

* cited by examiner

*Primary Examiner* — Angela A Armstrong

(57) ABSTRACT

Embodiments disclosed herein provide systems and methods for override vocoder capacity operating point (COP) allocation. In a particular embodiment, a method provides determining a communication load on a wireless access node. Based on the communication load, the method provides allocating a first COP for a vocoder, wherein the vocoder is used on voice communications exchanged with the wireless access node. The method further provides determining a frame error rate of a wireless communication link between a wireless communication device and the wireless access node. If the frame error rate indicates that a COP of the wireless communication link should be lower than the first COP, the method provides allocating an override COP to the COP of the wireless communication link based on the frame error rate.

18 Claims, 6 Drawing Sheets

| COP VALUE TABLE 500 ||
|---|---|
| FER | COP |
| >5% | 0 |
| 4-5% | 1 |
| 3-4% | 2 |
| 2-3% | 3 |
| 1-2% | 4 |
| 0-1% | 5, 6, 7 |

OVERRIDE VOCODER CAPACITY OPERATING POINT ALLOCATION

TECHNICAL BACKGROUND

Modern communications systems use digital encoding technologies to encode voice communications. Some of these encoding technologies are variable bitrate encoders that are able to use different bitrates under the same encoding scheme. Higher bitrates provide higher voice quality but also require more bandwidth for communication exchanges. Similarly, lower bitrates provide lower voice quality while requiring less bandwidth for communication exchanges.

Accordingly, a communication system operator may choose a bitrate for a variable bitrate encoder that provides a compromise between bandwidth usage and voice quality. If the amount of available bandwidth is high, then the operator may choose a higher bitrate for the encoder so that users experience greater voice quality. However, if the amount of available bandwidth is low, the operator may choose a lower bitrate so that more calls can be serviced at a lower voice quality. These compromises may be especially necessary in the case of wireless communication networks, which typically have limited wireless spectrum bandwidth.

OVERVIEW

Embodiments disclosed herein provide systems and methods for override vocoder capacity operating point (COP) allocation. In a particular embodiment, a method provides determining a communication load on a wireless access node. Based on the communication load, the method provides allocating a first COP for a vocoder, wherein the vocoder is used on voice communications exchanged with the wireless access node. The method further provides determining a frame error rate of a wireless communication link between a wireless communication device and the wireless access node. If the frame error rate indicates that a COP of the wireless communication link should be lower than the first COP, the method provides allocating an override COP to the COP of the wireless communication link based on the frame error rate.

BRIEF DESCRIPTION OF THE DRAWINGS

FIG. 5 illustrates a table used for override vocoder COP allocation.

DETAILED DESCRIPTION

The following description and associated figures teach the best mode of the invention. For the purpose of teaching inventive principles, some conventional aspects of the best mode may be simplified or omitted. The following claims specify the scope of the invention. Note that some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by the claims and their equivalents.

Figure 1:
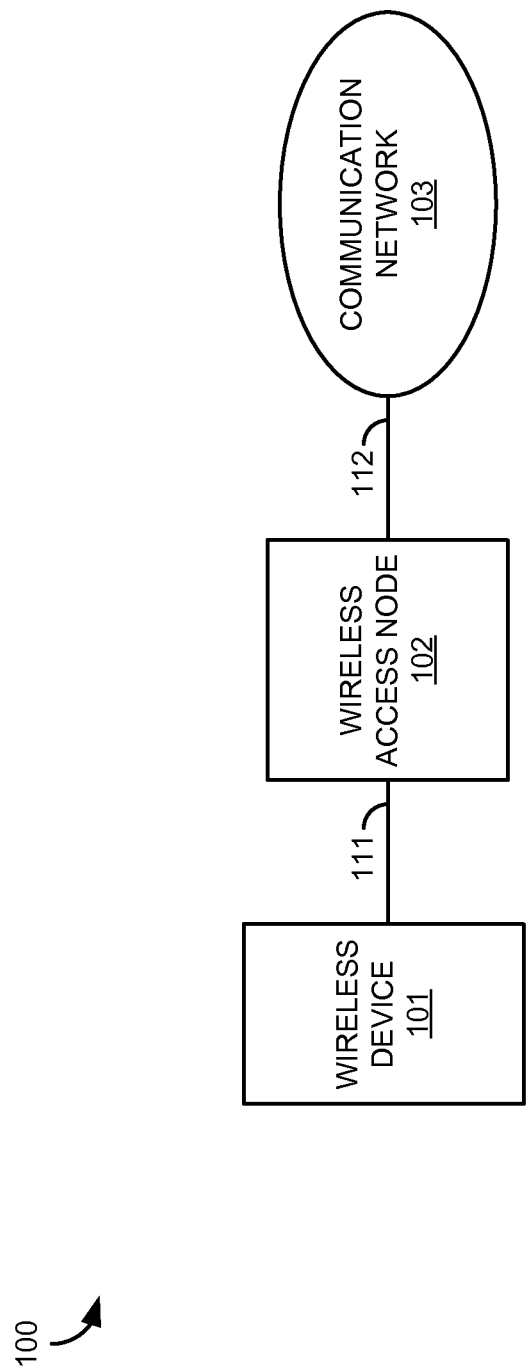
FIG. 1 illustrates a wireless communication system for override vocoder capacity operating point (COP) allocation.

FIG. 1 illustrates wireless communication system 100. Wireless communication system 100 includes wireless communication device 101, wireless access node 102, and communication network 103. Wireless communication device 101 and wireless access node 102 communicate over wireless link 111. Wireless access node 102 and communication network 103 communicate over communication link 112.

In operation, wireless access node 102 provides wireless devices, such as wireless device 101, with wireless access to communication network 103. The wireless devices may exchange voice, data, or any other type of communications with communication network 103 via access node 102. Voice communications, in particular, between access node 102 and the wireless devices are encoded using a variable bitrate encoder. Variable bitrate encoders are commonly referred to as vocoders when used for voice encoding.

Some vocoders, such as the Enhanced Variable Rate Codec-B (EVRC-B) vocoder, adjust their bitrates based on a capacity operating point (COP). Access node 102 is able to allocate a certain COP to the vocoder based on a desired level of bandwidth usage and voice quality. Higher COPs coincide with higher bitrate encoding and, therefore, also coincide with greater bandwidth usage for voice communications. Consequently, during times of high communication traffic with wireless devices, access node 102 may allocate a lower COP to the vocoder. The lower COP lowers the bitrate, which causes voice communications to use less bandwidth and allows more voice communications to use the total bandwidth available to access node 102. However, using the same COP for all communications on access node 102 may not address the vocoder needs of a particular wireless device.

Figure 2:
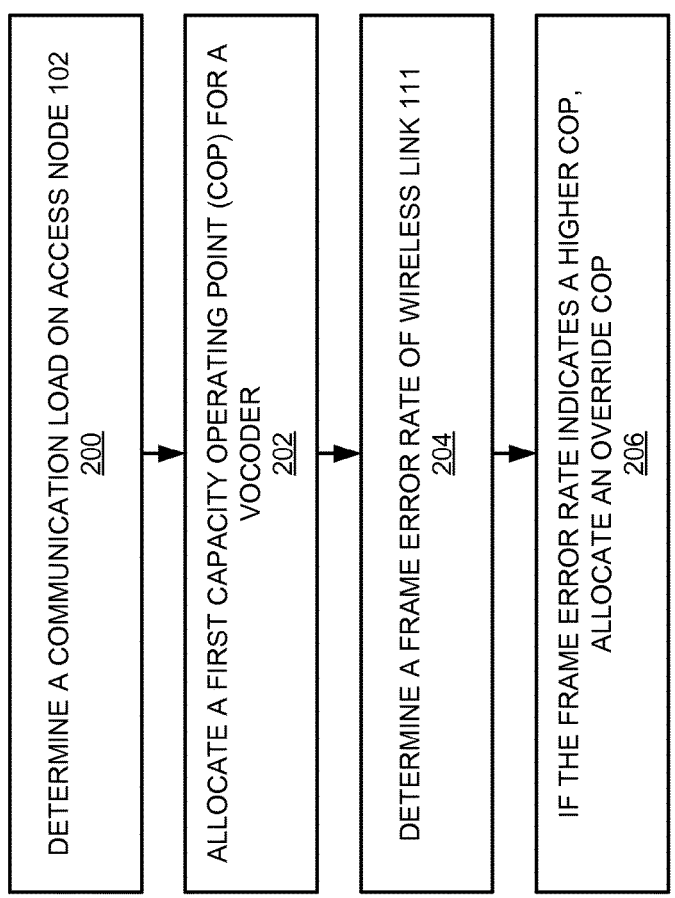
FIG. 2 illustrates the operation of the wireless communication system for override vocoder COP allocation.

FIG. 2 illustrates the operation of wireless communication system 100 for override vocoder COP allocation. The operation begins by determining a communication load on wireless access node 102 (step 200). This determination may be made by access node 102 itself, by a control system connected to access node 102, or by some other system located on communication network 103 or elsewhere. Accordingly, access node 102 and any other system with information pertinent to the communication load on access node 102 may transfer that information to whatever system determines the communication load on access node 102.

After determining the communication load for access node 102, a first capacity operating point (COP) is allocated for a vocoder based on the communication load, wherein the vocoder is used on voice communications exchanged with wireless access node 102 (step 202). If access node 102 determined the communication load, then access node 102 will also allocate the COP. However, if another system determined the communication load, then that system will send information about that communication load to access node 102 so that access node 102 can allocate the COP. Alternatively, the other system will determine a COP based on the communication load and transfer the COP to access node 102 for allocation.

The communication load may be determined based on the number of wireless devices currently registered with access node 102, the number of wireless devices that are currently exchanging voice communications via access node 102, the number of devices that have exchanged voice communications with access node 102 within a period of time, the amount of radio frequency (RF) bandwidth being used for communications with access node 102, or any other measure of communication load on a wireless access node—including combinations thereof.

If the communication load is low, then a high COP will be allocated to the vocodor to allow greater voice quality. Periods of low communication load typically mean that access node 102 will have enough bandwidth to support the higher quality voice calls that are afforded by higher COPs. As communication loads get higher, then lower COPs will be allocated to the vocoder so as to free up bandwidth for the additional communication load at the expense of voice quality.

After or concurrent to the above steps, the operation further determines a frame error rate of wireless communication link 111 between wireless communication device 101 and wireless access node 102 (step 204). The frame error rate is an indicator of the condition of wireless link 111. The frame error rate measures the number of data frames that are received with errors in relation to the total number of frames received. Higher frame error rates typically correspond to poor wireless link quality. The frames measured to determine the frame error rate may be only frames carrying voice communications but may also include frames carrying other types of communications.

If the frame error rate indicates that a COP of wireless communication link 111 should be lower than the first COP, an override COP is allocated to the COP of wireless communication link 111 based on the frame error rate (step 206). Since a higher frame error rate may correspond to poor wireless link conditions, it is desirable to lower the bit rate of communications exchanged on a wireless link with poor conditions because lower bit rate communications use less bandwidth and are more likely to arrive at their destination with fewer errors.

In an example, a data structure may maintain values of frame error rates and COPs corresponding to each frame error rate. Accordingly, if the COP corresponding to the frame error rate on wireless link 111 in the data structure is lower than the first COP, then that corresponding COP will override the first COP on wireless link 111. Thus, the vocoder will use the override COP for voice communications on wireless link 111 so that voice communications on wireless link 111 have a lower bit rate to account for possible poor link conditions. Voice communications with other wireless devices will continue to be encoded using the first COP unless the first COP is similarly overridden for the links with those other wireless devices.

In an alternative example, if the frame error rate is above a threshold indicating that the COP of wireless link 111 should be lower, then the override COP for wireless device 101 may be decreased until an appropriate frame error rate is achieved. For instance, the override COP may be decreased by one between each frame error rate determination until either the frame error rate reaches an acceptable value in relation to the override COP or the COP reaches zero.

Referring back to FIG. 1, wireless communication device 101 comprises Radio Frequency (RF) communication circuitry and an antenna. The RF communication circuitry typically includes an amplifier, filter, modulator, and signal processing circuitry. Wireless communication device 101 may also include a user interface, memory device, software, processing circuitry, or some other communication components. Wireless communication device 101 may be a telephone, computer, e-book, mobile Internet appliance, wireless network interface card, media player, game console, or some other wireless communication apparatus—including combinations thereof.

Wireless access node 102 comprises RF communication circuitry and an antenna. The RF communication circuitry typically includes an amplifier, filter, RF modulator, and signal processing circuitry. Wireless access node 102 may also comprise a router, server, memory device, software, processing circuitry, cabling, power supply, network communication interface, structural support, or some other communication apparatus. Wireless access node 102 could be a base station, Internet access node, telephony service node, wireless data access point, or some other wireless communication system—including combinations thereof.

Communication network 103 comprises network elements that provide communications services to wireless device 101 through wireless access node 102. Communication network 103 may comprise switches, wireless access nodes, Internet routers, network gateways, application servers, computer systems, communication links, or some other type of communication equipment—including combinations thereof.

Wireless link 111 uses the air or space as the transport media. Wireless link 111 may use various protocols, such as Code Division Multiple Access (CDMA), Evolution Data Only (EVDO), Worldwide Interoperability for Microwave Access (WIMAX), Global System for Mobile Communication (GSM), Long Term Evolution (LTE), Wireless Fidelity (WIFI), High Speed Packet Access (HSPA), or some other wireless communication format. Communication link 112 uses metal, glass, air, space, or some other material as the transport media. Communication link 112 could use various communication protocols, such as Time Division Multiplex (TDM), Internet Protocol (IP), Ethernet, communication signaling, CDMA, EVDO, WIMAX, GSM, LTE, WIFI, HSPA, or some other communication format—including combinations thereof. Communication link 112 could be a direct link or may include intermediate networks, systems, or devices.

Figure 3:
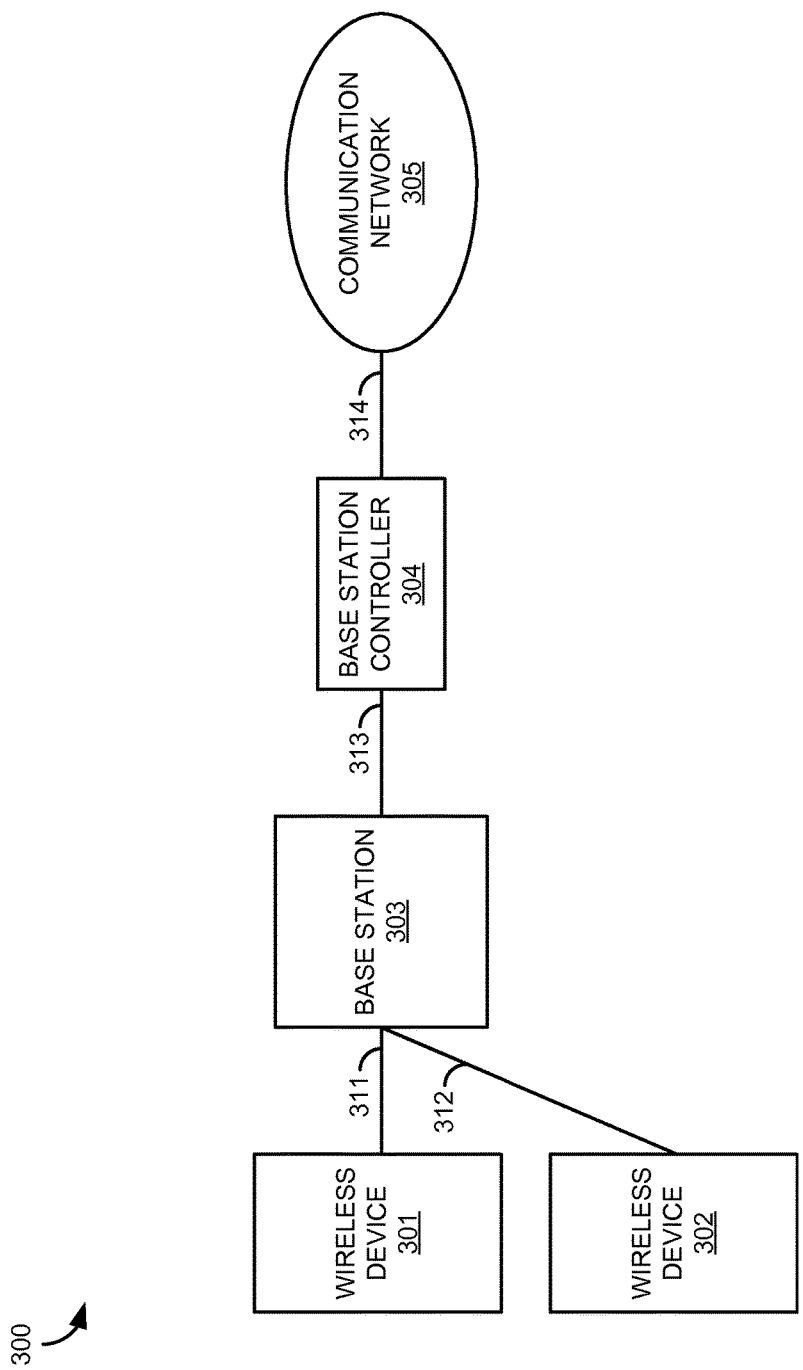
FIG. 3 illustrates a wireless communication system for override vocoder COP allocation.

FIG. 3 illustrates wireless communication system 300. Wireless communication system 300 includes wireless communication devices 301 and 302, base station 303, base station controller (BSC) 304, and communication network 305. Wireless communication device 301 and base station 303 communicate over wireless link 311. Wireless communication device 302 and base station 303 communicate over wireless link 312. Base station 303 and BSC 304 communication over communication link 313. BSC 304 and communication network 305 communicate over communication link 314.

In operation, base station 303 provides access to communication network 305 for wireless devices 301, 302, and possibly other wireless devices not depicted. BSC 304 controls the operation of base station 303 and may also control the operation of additional base stations not depicted.

Figure 4:
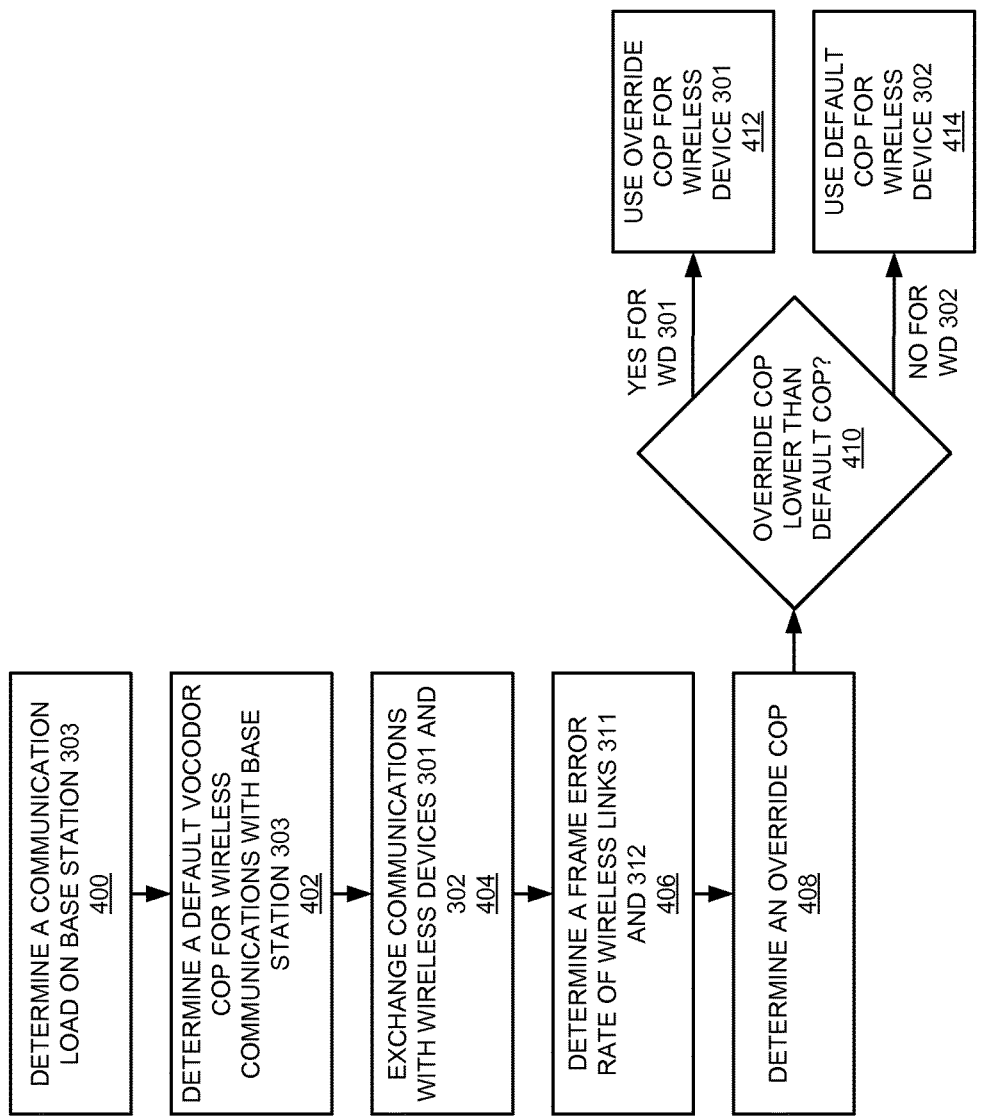
FIG. 4 illustrates the operation of the wireless communication system for override vocoder COP allocation.

FIG. 4 illustrates the operation of wireless communication system 300 for override vocoder COP allocation. BSC 304 begins the operation by determining a wireless communication load on base station 303 (step 400). BSC 304 may receive information relating to the communication load from base station 303 in order to make the communication load determination. The wireless communication load may be determined based on any method used for determining a load on a base station. For example, communication load may be an amount of wireless bandwidth being used by wireless devices communicating with base station 303 relative to the total amount of wireless bandwidth that is allotted to base station 303. As the communication load approaches and reaches the total amount of bandwidth, then the bandwidth used by individual communicating wireless devices will need to be lowered in order to allow more devices to communicate with base station 303. BSC 304 may receive information relating to the communication load from base station 303 in order to make the communication load determination.

Accordingly, BSC 304 determines a default vocodor COP for wireless voice communications with base station 303 (step 402). In this example, the COP may take integer values from 0 to 7 with 7 corresponding to the highest bitrate and 0 corresponding to the lowest bitrate. If there is available bandwidth, then the default COP may be allocated at a value closer to 7 but not necessarily 7 depending on a maximum COP allowed by BSC 304. As communication load increases, the allocated COP value will decrease until the COP reaches 0 corresponding to a minimum bitrate of the vocoder. Once the default COP is allocated, wireless voice communications exchanged with base station 303 are exchanged at the default COP (step 404).

In some embodiments, BSC 304 will periodically update the default COP in order to maintain an optimum COP level for the current communication load on base station 303.

While exchanging voice communications with wireless devices 301 and 302, BSC 304 determines a frame error rate of wireless links 311 and 312 (step 406). The frame error rate is a ratio of data frames that are received with errors, or not at all, compared with the number of data frames transmitted. The frame error rate may factor in only the frame error rate of communications received by base station 303 but may also consider the frame error rate of communications received by wireless devices 301 and 302. BSC 304 may receive information relating to the frame error rate from base station 303 and wireless devices 301 and 302 in order to make the frame error rate determination.

Once a frame error rate is determined, BSC 304 determines an override COP for each of wireless links 311 and 312 (step 408). Each override COP is determined using COP value table 500 shown in FIG. 5. As can be seen from table 500, as the frame error rate percentage increase the COP value decreases. As stated above, lower bitrates benefit poor wireless communication links and a high frame error rate likely indicates a poor wireless link. Thus, once the frame error rate exceeds 5%, the COP is minimized at 0 corresponding to the lowest bitrate.

After determining an override COP, BSC 304 determines whether the override COP is lower than the default COP (step 410). If the override COP is lower than the default COP, then BSC 304 allocates the override COP to the wireless link that corresponds to the override COP. However, if the override COP is higher than the default COP, then BSC 304 allows the wireless link that corresponds to the override COP to continue using the default COP. This allows an individual wireless link to use COPs lower than the default COP when conditions on the individual wireless link warrants a lower COP. Contemporaneously, the other wireless links with base station 303 continue using the higher default COP except for those other wireless links where the default COP has been similarly overridden. If the override COP were equivalent to the default COP, then either the default or the override COP may be allocated.

In this example, the default COP is determined to be 3. Additionally, in accordance with table 500, the frame error rate of wireless link 311 is determined to fall between 4 and 5% with an override COP of 1 and the frame error rate of wireless link 312 is determined to fall between 1 and 2% with an override COP of 4. Therefore, since the override COP of wireless link 311 is less than the default COP, BSC 304 allocates the override COP for communications with wireless device 301 on wireless link 311 (step 412). Alternatively, since the override COP of wireless link 312 is greater than the default COP, BSC 304 allows the default COP to stay allocated for communications with wireless device 201 on wireless link 312 (step 414).

In some embodiments, BSC 304 will periodically update the override COP for each of wireless links 311 and 312 and compare the updated override COP to the current default COP in order to maintain an optimum COP level for the current frame error rate on each wireless link 311 and 312.

Figure 6:
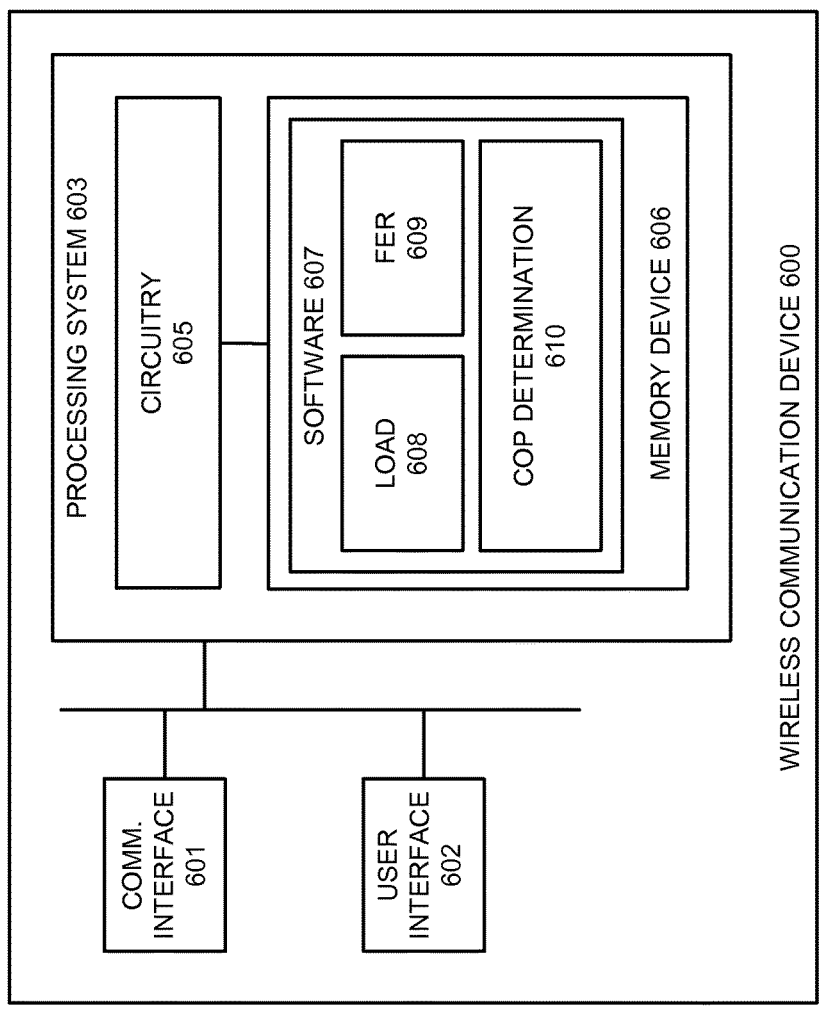
FIG. 6 illustrates a communication control system for override vocoder COP allocation.

FIG. 6 illustrates communication control system 600. Communication control system 600 is an example of BSC 304, although BSC 304 may use alternative configurations. Communication control system 600 comprises communication interface 601, user interface 602, and processing system 603. Processing system 603 is linked to communication interface 601 and user interface 602. Processing system 603 includes processing circuitry 605 and memory device 606 that stores operating software 607.

Communication interface 601 comprises components that communicate over communication links, such as network cards, ports, RF transceivers, processing circuitry and software, or some other communication devices. Communication interface 601 may be configured to communicate over metallic, wireless, or optical links. Communication interface 601 may be configured to use TDM, IP, Ethernet, optical networking, wireless protocols, communication signaling, or some other communication format—including combinations thereof.

User interface 602 comprises components that interact with a user. User interface 602 may include a keyboard, display screen, mouse, touch pad, or some other user input/output apparatus. User interface 602 may be omitted in some examples.

Processing circuitry 605 comprises microprocessor and other circuitry that retrieves and executes operating software 607 from memory device 606. Memory device 606 comprises a non-transitory storage medium, such as a disk drive, flash drive, data storage circuitry, or some other memory apparatus. Operating software 607 comprises computer programs, firmware, or some other form of machine-readable processing instructions. Operating software 607 includes communication load determination module 608, frame error rate determination module 609, and COP determination module 610. Operating software 607 may further include an operating system, utilities, drivers, network interfaces, applications, or some other type of software. When executed by circuitry 605, operating software 607 directs processing system 603 to operate communication control system 600 as described herein.

In particular, communication load determination module 608 directs processing system 603 to determine a communication load on a wireless access node. Based on the communication load, COP determination module 610 directs processing system 603 to allocate a first capacity operating point (COP) for a vocoder, wherein the vocoder is used on voice communications exchanged with the wireless access node. Frame error rate determination module 609 directs processing system 603 to determine a frame error rate of a wireless communication link between a wireless communication device and the wireless access node. If the frame error rate indicates that a COP of the wireless communication link should be lower than the first COP, COP determination module 610 directs processing system 603 to allocate an override COP to the COP of the wireless communication link based on the frame error rate.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of operating a wireless communication system, comprising:
   determining a communication load on a wireless communication link between a wireless access node and a wireless communication device, and based on the communication load, allocating a first vocoder capacity operating point (COP) in the wireless communication device,
      if the wireless access node determines the communication load, then the wireless access node will also allocate the first vocoder COP;
      if another system determines the communication load, then the other system will send information about the communication load to the wireless access node so that the wireless access node can allocate the first vocoder COP;
   determining a frame error rate of the wireless communication link between the wireless communication device and the wireless access node; and
   if the frame error rate exceeds a threshold, then overriding the first vocoder COP of the wireless communication link with a second vocoder COP, wherein the first vocoder COP and the second vocoder COP are integer values between 0-7 and are used on voice communications exchanged with the wireless access node and the wireless communication device.

2. The method of claim 1, wherein if the frame error rate is greater than 5% then the second vocoder COP should be 0.

3. The method of claim 1, wherein if the frame error rate is between 4% and 5% then the second vocoder COP should be 1.

4. The method of claim 1, wherein if the frame error rate is between 3% and 4% then the second vocoder COP should be 2.

5. The method of claim 1, wherein if the frame error rate is between 2% and 3% then the second vocoder COP should be 3.

6. The method of claim 1, wherein if the frame error rate is between 1% and 2% then the second vocoder COP should be 4.

7. The method of claim 1, wherein if the frame error rate is between 0% and 1% then the second vocoder COP should be one of 5, 6, or 7.

8. The method of claim 1, wherein the communication load is a radio frequency (RF) load.

9. The method of claim 1, wherein the vocoder is an Enhanced Variable Rate Codec-B (EVRC-B).

10. A wireless communication system, comprising:
    a communication interface configured to receive load information about a communication load on a wireless communication link between a wireless access node and a wireless communication device and error information about a frame error rate of the wireless communication link between the wireless communication device and the wireless access node;
    a processing system configured to use the load information to determine the communication load on the wireless access node, based on the communication load, allocate a first vocoder capacity operating point (COP) in the wireless communication device, use the error information to determine the frame error rate of the wireless communication link between the wireless communication device and the wireless access node, and, if the frame error rate exceeds a threshold then overriding the first vocoder COP of the wireless communication link with a second vocoder COP, wherein the first vocoder COP and the second vocoder COP are integer values between 0-7 and are used on voice communications exchanged with the wireless access node and the wireless communication device
       if the wireless access node determines the communication load, then the wireless access node will also allocate the first vocoder COP;
       if another system determines the communication load, then the other system will send information about the communication load to the wireless access node so that the wireless access node can allocate the first vocoder COP.

11. The system of claim 10, wherein if the frame error rate is greater than 5% then the second vocoder COP should be 0.

12. The system of claim 10, wherein if the frame error rate is between 4% and 5% then the second vocoder COP should be 1.

13. The system of claim 10, wherein if the frame error rate is between 3% and 4% then the second vocoder COP should be 2.

14. The system of claim 10, wherein if the frame error rate is between 2% and 3% then the second vocoder COP should be 3.

15. The system of claim 10, wherein if the frame error rate is between 1% and 2% then the second vocoder COP should be 4.

16. The system of claim 10, wherein if the frame error rate is between 0% and 1% then the second vocoder COP should be one of 5, 6, or 7.

17. The system of claim 10, wherein the communication load is a radio frequency (RF) load.

18. The system of claim 10, wherein the vocoder is an Enhanced Variable Rate Codec-B (EVRC-B).

* * * * *